United States Patent Office 3,505,319
Patented Apr. 7, 1970

3,505,319
PYRROLO[1,2-a]INDOLIUM SALTS AND CARBO-CYANINE DYES CONTAINING A PYRROLO [1,2-a]INDOLIUM NUCLEUS
Gene L. Oliver, Rochester, N.Y., assignor to Eastman Kodak Company, Rochester, N.Y., a corporation of New Jersey
No Drawing. Original application Dec. 28, 1964, Ser. No. 421,680. Divided and this application Jan. 8, 1968, Ser. No. 712,882
Int. Cl. C09b 23/06; G03c 1/10
U.S. Cl. 260—240.6         13 Claims

ABSTRACT OF THE DISCLOSURE

The invention relates to a new class of pyrrolo[1,2-a]-indolium salts and cyanine photographic sensitizing dyes derived therefrom and their use in silver halide emulsions, and to methods for preparation of such new dyes.

---

This application is a division of my copending U.S. patent application Ser. No. 421,680, filed Dec. 28, 1964.

The new class of carbocyanine dyes of the invention include those represented by the following general formulas:

I.
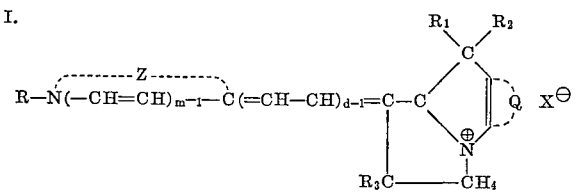

II.
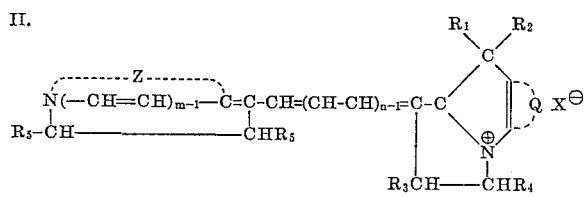

and

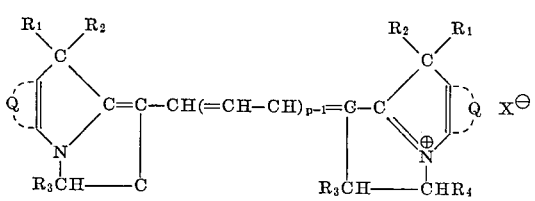

wherein $d$ represents an integer of from 2 to 5, $m$ represents an integer of from 1 to 2, and $n$ and $p$ each represents an interger of from 1 to 4, R represents an alkyl group, e.g., methyl, sulfoethyl, carboxyethyl, hydroxypropyl, sulfobutyl, carboxybutyl, hexyl, octyl, etc., or an aryl group, e.g., phenyl, sulfophenyl, carboxyphenyl, tolyl, etc.; $R_1$ and $R_2$ each represents the same or different alkyl group, e.g., methyl ethyl, propyl, isopropyl, butyl, amyl, etc., $R_3$, $R_4$, $R_5$ and $R_6$ each represents the hydrogen atom or the same or different alkyl group, e.g., methyl or ethyl, each X represents an acid anion, e.g., chloride, bromide, iodide, thiocyanate, sulfamate, methyl sulfate, ethyl sulfate, perchlorate, p-toluenesulfonate, etc., each Q represents the nonmetallic atoms required to complete an aromatic ring such as a benzene ring, said ring completing a 9,9 - dialkyl - 2,3 - dihydro - 1H, 9H - pyrrolo[1,2-a]indolium salt nucleus, or the nonmetallic atoms required to complete a naphthalene ring, said ring when 1,2-naphtho completing a 11,11 - dialkyl - 8,9 - dihydro - 10H,11H-benzo[e]pyrrolo[1,2 - a]indolium salt, or when 2,3 - naphtho completing a 11,11 - dialkyl - 2,3 - dihydro - 1H,11H-benzo[f]pyrrolo[1,2-a]indolium salt, or when 2,1-naphtho completing a 7,7-dialkyl-9,10-dihydro-7H,8H-benzo-[g]pyrrolo[1,2-a]indolium salt, or said benzene and naphthalene rings substituted by one or more substituents such as an alkyl group, e.g., methyl, ethyl, propyl, isopropyl, butyl, benzyl, etc., an alkoxy group, e.g., methoxy, ethoxy, propyoxy, isopropoxy, butoxy, etc., an aryl group, e.g., phenyl, tolyl, etc., an aryloxy group, e.g. phenoxy, etc., a halogen, e.g., chlorine, bromine, etc., or a dialkylamino group wherein the alkyl radicals are the same or different radicals, e.g., methyl, ethyl, propyl, isopropyl, butyl, etc., and the like, and each Z represents the nonmetallic atoms required to complete a 5- to 6-membered heterocyclic nucleus, such as those, selected from the class consisting of a thiazole nucleus (e.g., thiazone, 4-methylthiazole, 4-phenylthiazole, 5-methylthiazole, 5-phenylthiazole, 4,5-dimethylthiazole, 4,5 - diphenylthiazole, 4 - (2 - thienyl) thiazole, etc.), a benzothiazole nucleus (e.g., benzothiazole, 4 - chlorobenzothiazole, 5 - chlorobenzothiazole, 6 - chlorobenzothiazole, 7 - chlorobenzothiazole, 4 - methylbenzothiazole, 5 - methylbenzothiazole, 6 - methylbenzothiazole, 5 - bromobenzothiazole, 6 - bromobenzothiazole, 4-phenylbenzothiazole, 5 - phenylbenzothiazole, 4 - methoxybenzothiazole, 5 - methoxybenzothiazole, 6 - methoxybenzothiazole, 5 - iodobenzothiazole, 6 - iodobenzothiazole, 4 - ethoxybenzothiazole, 5 - ethoxybenzothiazole, tetrahydrobenzothiazole, 5,6 - dimethoxybenzothiazole, 5,6-dioxymethylenebenzothiazole, 5 - hydroxybenzothiazole, 6 - hydroxybenzothiazole, etc.), a naphthothiazole nucleus (e.g., α - naphthothiazole, β - naphthothiazole, 5 - methoxy - β, β - naphthothiazole, 5 - ethoxy - β - naphthothiazole, 8 - methoxy - α - naphthothiazole, 7 - methoxy-α - naphthothiazole, etc.), a thionaphtheno - 7',6',4,5-thiazole nucleus (e.g., 4'-methoxythianaphtheno-7',6',4,5-thiazole, etc.), an oxazole nucleus (e.g., 4-methyloxazole, 5 - methyloxazole, 4 - phenyloxazole, 4,5 - diphenyloxazole, 4 - ethyloxazole, 4,5 - dimethyloxazole, 5 - phenyloxazole, etc.), a benzoxazole nucleus (e.g., benzoxazole, 5 - chlorobenzoxazole, 5 - methylbenzoxazole, 5 - phenylbenzoxazole, 6 - methylbenzoxazole, 5,6 - dimethylbenzoxazole, 4,6 - dimethylbenzoxazole, 5 - methoxybenzoxazole, 5 - ethoxybenzoxazole, 5 - chlorobenzoxazole, 6-methoxybenzoxazole, 5 - hydroxybenzoxazole, 6 - hydroxybenzoxazole, etc.) a naphthoxazole nucleus (e.g., α - naphthoxazole, β - naphthoxazole, etc.), a selenazole nucleus (e.g., 4 - methylselenazole, 4 - phenylselenazole, etc.) a benzoselenazole nucleus (e.g., benzoselenazole, 5-chlorobenzoselenazole, 5 - methoxybenzoselenazole, 5-hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.),a 4-pyridine nucleus (e.g., 4-pyridine, 3-methyl-4-pyridine, etc.), a 2-quinoline nucleus (e.g., 2-quinoline, 3-methyl-2-quinoline, 5 - ethyl - 2 - quinoline, 6 - chloro - 2 - quinoline, 8-chloro - 2 - quinoline, 6 - methoxy - 2 - quinoline, 8-ethoxy - 2 - quinoline, 8 - hydroxy - 2 - quinoline, etc.), a 4 - quinoline nucleus (e.g., 4 - quinoline, 6 - methoxy-4 - quinoline, 7 - methyl - 4 - quinoline, 8 - chloro - 4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 3,3,5-trimethylindolenine, 3,3,7 - trimethylindolenine, etc.), an imidazole nucleus (e.g., imidazole, 1 - alkylimidazole, 1 - alkyl - 4-phenylimidazole, 1 - alkyl - 4,5 - dimethylimidazole, etc.), a bemzimidazole nucleus (e.g., benzimidazole, 1-alkylbenzimidazole, 1 - aryl - 5,6 - dichlorobenzimidazole, etc.), a naphthimidazole nucleus (e.g., 1 - alkyl - α - naphthimidazole, 1 - aryl - β - naphthimidazole, 1 - alkyl - 5 - methoxy-α-naphthimidazole, etc.), etc.

It is, accordingly, an object of the invention to provide a new class of carbocyanine dyes as defined above. A further object is to provide methods for making these new dyes. Another object is to provide light-sensitive compositions containing at least one of my dyes. Another object is to provide dyes that have a greater tendency to aggregate than the corresponding dyes having at least one N-methyl or N-ethyl indolenine nucleus. Other objects will become apparent from a consideration of the description and the examples.

In accordance with the invention, I prepare the new carbocyanine dyes represented by above Formula I, for example, by reacting (condensing) a cyclammonium quaternary salt selected from those represented by the following general formula:

VI.
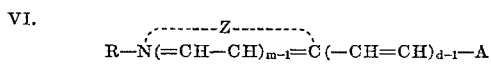

wherein $d$, $m$, R, X and Z are as previously defined, and A represents a group selected from —$SR_7$ and —$NR_8R_9$ wherein $R_7$ represents an alkyl group, e.g., methyl, ethyl, propyl, isopropyl, butyl, hexyl, decyl, dodecyl, etc., or an aryl group, e.g., phenyl, tolyl, etc., $R_8$ represents a phenyl or tolyl group, and $R_9$ represents an acyl group, e.g., acetyl, propionyl, benzoyl, etc., with a cyclammonium quaternary salt selected from those represented by the following general formula:

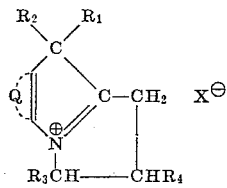

wherein $R_1$, $R_2$, $R_3$, $R_4$, X and Q are as previously defined.

The dye compounds of above Formula I can also be prepared by condensing a cyclammonium quaternary salt selected from those having the general formula:

VI.
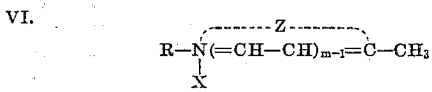

wherein $m$, R, X and Z are as previously defined with a cyclammonium salt selected from those represented by the general formula:

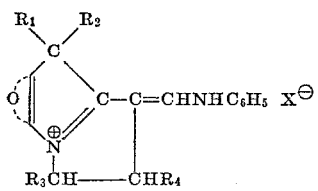

wherein $R_1$, $R_2$, $R_3$, $R_4$, X and Q are as previously defined.

The dye compounds of Formula II above are readily prepared by condensing a cyclammonium quaternary salt of the formula:

VIII.
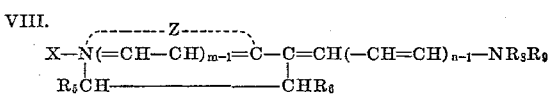

wherein $m$, $n$, $R_5$, $R_6$, $R_8$, $R_9$, X and Z are as previously defined with a cyclammonium quaternary salt of Formula V above.

To prepare the dye compounds of Formula III above wherein $p$ is 1 a cyclammonium quaternary salt of Formula V is reacted with a dialkoxymethyl ester of a lower saturated aliphatic monocarboxylic acid, for example, dimethoxymethyl acetate, or wherein $p$ is 2 with a 1,1,3-trialkoxy-2-propene, for example, 1,1,3-trimethoxy-2-propene. These types of compounds are prepared by the methods of Examples 1, 4 and 10 herein.

The condensation reactions can be accelerated by heating up to reflux temperatures of the reaction mixture, preferably in an inert solvent such as methanol, ethanol, n-propanol, n-butanol, acetone, -,4-dioxane, dimethylformamide, pyridine, quinoline, isoquinoline, etc. The reactants can be employed with an excess of one or the other, i.e., greater than the stoichiometrically calculated equivalents, but preferably in approximately equimolar proportions for the best results. Advantageously, the condensations are carried out in the presence of a basic condensing agent such as a trialkylamine, e.g., triethylamine, tri-n-propylamine, tri - n - butylamine, etc., N - methylpiperidine, N-ethylpiperidine, N,N-dimethylaniline, etc.

The heterocyclic intermediates of above Formula IV and VIII type are described, for example, in Brooker and White U.S. Reissue Patent No. 24,292, dated Mar. 19, 1957; and in Heseltine and Brooker U.S. Patent No. 3,140,182, dated July 7, 1964. Those of above Formula VI type are described, for example, in Brooker and White U.S. Patent No. 2,058,406, dated Oct. 27, 1936; and in Kendall U.S. Patent No. 2,265,908, dated Dec. 9, 1941.

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of my new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The concentration of the new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of my new dyes, the following procedure is satisfactory. A quantity of the dye is dissolved in a suitable solvent and a volume of this solution containing from 5 to 100 mgs. of dye is slowly added to about 1000 cc. of a gelatino-silver halide emulsion. With most of our dyes, 10 to 20 mgs. of dye per liter of emulsion suffice to produce the maximum sensitizing effect with the ordinary gelatino-silver halides including silver chloride, bromide, bromoiodide, chlorobromide, chlorobromoiodide. etc. emulsions. With fine-grain emulsions, which include most of the ordinary employed gelatino-silver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting my invention in any sense, as it will be apparent that my new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W.D. Baldsiefen 2,540,085, granted Feb. 6, 1951; R. E. Damschroder 2,597,856, granted May 27, 1952, and H. C. Yutzy et al. 2,597,915, granted May 27, 1952), various palladium compounds, such as palladium chloride (W. D. Baldsiefen U.S. 2,540,086, granted Feb. 6, 1951), potassium chloropalladate (R. E. Stauffer et al. U.S. 2,598,079, granted May 27, 1952), etc., or mixture of such sensitizers; antifoggants, such as ammonium chloroplatinate (A. P. H. Trivelli et al. U.S. 2,566,245, granted Aug. 28, 1951), ammonium chloroplatinite (A. P. H. Trivelli et al. U.S. 2,566,263, granted Aug. 28, 1951), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (A. Miller U.S. 1,763,533, granted June 10, 1930), chrome alum (U.S. 1,763,533), glyoxal (J. Brunken U.S. 1,870,354, granted Aug. 9, 1932), dibromacrolein (O. Block et al. British 406,750, accepted Mar. 8, 1934), etc.; color couplers, such as those described in I. F. Salminen et al. U.S. Patent 2,423,730, granted July 7, 1947, Spence and Carroll U.S. Patent 2,640,776, issued June 2, 1953, etc.; or mixtures of such addenda. Dispersing agents for color couplers, such as those set forth in U.S. patents to E. E. Jelley et al. 2,322,027, granted June 15, 1943, and L. D. Mannes et al. 2,304,940, grantd Dec. 15, 1942, can also be employed in the above-described emulsions.

The following examples will serve to illustrate more fully the manner of preparing the new class of carbocyanine dyes of the invention.

EXAMPLE 1

1,8,1′,10-diethylene-3,3′,3′-tetramethylindocarbocyanine iodide

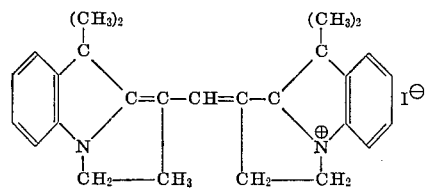

9,9 - dimethyl-2,3-dihydro-1H,9H-pyrrolo[1,2-a]indolium bromide (1.07 g., 4 mmol.) and diethoxymethyl acetate (0.65 g., 4 mmol.) were refluxed in pyridine (4 ml.) for approximately ten minutes and then chilled. Ether (10 ml.) was added and the mixture allowed to stand overnight. The ether solution was decanted from the oily crystals which were taken up in 20 ml. acetone. Sodium iodide (0.3 g., 2mmol.) was added to the solution which was heated to boiling and then chilled. The oily crystals were filtered off, and then shaken with ether and water for about 5 minutes. The crystalline dye was separated from the oily impurity by this treatment and was filtered off and dried. The yield of the crude dye was 0.36 g. (31%). The dye was recrystallized from 30% aqueous ethanol and melted at 277.5–278.5° C. dec. It sensitized a gelatino-silver-bromoiodide emulsion to 670 mμ with maxima at 570, 600, and 630 0 mμ.

EXAMPLE 2

3′-ethyl-1,8-ethylene-3,3-dimethylindothiacarbocyanine iodide

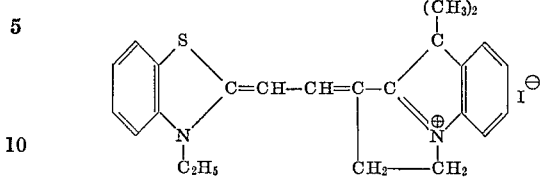

9,9 - dimethyl - 2,3-dihydro-1H,9H-pyrrolo[1,2]indolium bromide (0.665 g., 2.5 mmol.) and 2-β-acetanilidovinyl-3-ethylbenzothiazolium iodide (1.13 g., 2.5 mmol.) were refluxed in ethanol (5 ml.) and trithylamine (0.35 ml., 2.5 mmol.) for three minutes. After chilling for three hours, the solid (1.20 g.) was filtered off and dried. The solid was boiled with ethanol (35 ml.) and the boiling solution filtered. The filtrate was evaporated to dryness and the resulting solid shaken with water and ether. The crystalline dye was obtained on filtering the ether-water mixture. It was recrystallized from ethanol (5 ml.) to which water (10 ml.) was added after filtration of the hot solution. On cooling 0.17 g. (14%) of the dye separated, M.P. 242–243° C. dec. It sensitized a gelatino-silver-bromoiodide emulsion to 660 mμ with maxima at 550, 610, and 630 mμ.

EXAMPLE 3

3′-ethyl-1,8-ethylene-3,3-dimethylindooxacarbocyanine iodide

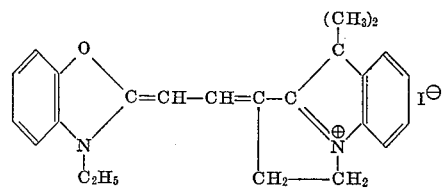

9,9-dimethyl-2,3-dihydro-1H,9H-pyrrolo[1,2 - a]indolium bromide (0.53 g., 2 mmol.) and 2-β-acetanilidovinyl-3-ethylbenzoxazolium iodide (0.87 g., and 2 mmol.) were refluxed in ethanol (4 ml.) and triethylamine (0.28 ml., 2.5 mmol.) for five minutes. After chilling overnight, the precipitate was filtered off. A second crop was obtained by diluting the filtrate with ether. The product, which contained inorganic salts was recrystallized from a mixture of 2-butanone and ethanol and again from 30% aqueous ethanol. The yield of the dye was 0.25 g. (26%), M.P. 248–249° C. dec. It sensitized a gelatino-silver-bromoiodide emulsion to 620 mμ with maxima at 570 and 600 mμ.

EXAMPLE 4

1.8:1′-12-diethylene-3,3,3′-tetramethylindodicarboxyamine bromide

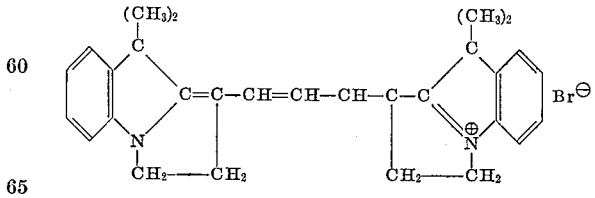

9,9 - dimethyl - 2,3 - dihydro - 1H,9H - pyrollo[1,2-a] indolium bromide (1.07 g., 4 mmol.) and 1,1,3-trimethoxy-2-propene were refluxed in pyridine (4 ml.) for five minutes. The dye precipitated from the hot solution was filtered after chilling. The crude dye was recrystallized from ethanol. The hot solution being diluted with two volumes of water to allow separation of the crystals. The yield was 0.33 g. (34%), M.P. 289–289.5° C. It sensitized a gelatino-silver-bromofodide emulsion to 750 mμ with a broad maximum to 710 mμ.

EXAMPLE 5

(A) 3'-ethyl-1,8-ethylene-3,3-dimethyl-4',5'-benzoindothiacarbocyanine bromide

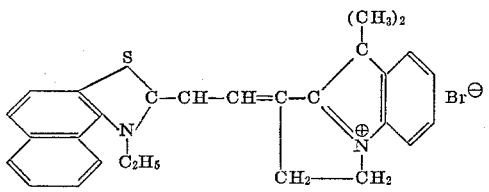

9,9 - dimethyl - 2,3 - dihydro - 1H,9H - pyrrolo[1,2-a] indolium bromide (0.80 g., 3 mmol.), 2-β-anilinovinyl-1-ethyl-naphtho[1,2-a]thiazolium p-toluenesulfonate (1.51 g., 3 mmol.), acetic anhydride (0.42 ml., 4.5 mmol.), and triethylamine (0.63 ml., 4.5 mmol.) were refluxed together in pyridine (5 ml.) for 7 minutes. After cooling to room temperature, the dye was precipitated with water (25 ml.). The mixture was chilled, then filtered, and the precipitate of dye dried. The physical data pertaining to the dye are given under (A) in Table 1.

(B) 3'-ethyl-1,8-ethylene - 3,3 - dimethylindoselenacarcarbocyanine iodide (C) 5'-chloro-3'-ethyl-1,8-ethylene - 3,3 - dimethylindooxacarbocyanine iodide (D) 5'-chloro-3'-ethyl-1,8-ethylene - 3,3 - dimethyl indothiacarbocyanine iodide (E) 5'-phenyl-3'-ethyl-1,8-ethylene - 3,3 - dimethylindoxocarbocyanine iodide (F) 3'-ethyl-1,8-ethylene-3,3-dimethyl - 6',7' - benzoindooxacarbocyanine iodide (G) 1'-ethyl-1,8-ethylene-3,3'-dimethylindo - 4' - carbocyanine iodide The dyes B, C, D, E, F and G were prepared by a method similar to that described for dye A. Their characteristics are given in Table 1.

TABLE 1.—CHARACTERISTICS OF CARBOCYANINES IN EXAMPLE I

| Dye | Crude Yield, Percent | Recrystallized from— | Melting Point (corr.) ° C |
|---|---|---|---|
| (A) | 89 | Ethanol | 228–229 (dec.) |
| (B) | 73 | ----do | 247.5–248 (dec.) |
| (C) | 55 | ----do | 281 (dec.) |
| (D) | 75 | ----do | 256–258 (dec.) |
| (E) | 69 | Methanol | 275–276 (dec.) |
| (F) | 69 | Ethanol | 259–260 (dec.) |
| (G) | 57 | 50/50 ethanol-water. | 259 (dec.) |

EXAMPLE 6

(A) 1'-ethyl-1,8-ethylene-3,3-dimethylindo-2'-carbocyanine iodide

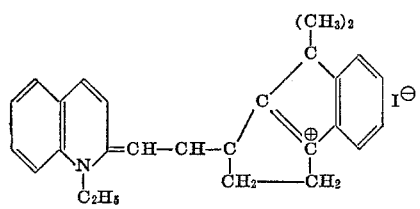

1 - anilinomethylene - 9,9 - dimethyl - 2,3 - dihydro-1H,9H - pyrrolo[1,2 - a]indolium bromide (1.11 g., 3 mmol.), 1-ethyl-2-methyl quinolinium iodide (0.90 g., 3 mmol.), acetic anhydride (0.42 ml., 4.5 mmol.), triethylamine (0.63 ml., 4.5 mmol.) and pyridine (5 ml.) were refluxed for 7 minutes, then cooled, diluted with water (25 ml.) and chilled. The solid which separated was filtered off, washed with water and ethanol, dried. The physical data pertaining to the dye are given under (A) in Table II.

Several other dyes were prepared in a similar manner (characteristics in Table II).

(B) 5,6-dichloro-1,3-diethyl-1',10 - ethylene - 3',3' - dimethylbenzimidabolindocarbocyanine iodide (C) 1,8;3',10-diethylene - 3,3 - dimethylindothiacarbocyanine bromide (D) 1,3-diethyl-1',12 - ethylene - 3',3' - dimethylimidazo [4,5-b] quinoindocarbocyanine iodide (E) 1,8;1',10-diethylene-3,3 - dimethylindo - 2' - carbocyanine bromide

TABLE II.—CHARACTERISTICS OF CARBOCYANINES IN EXAMPLE II

| Dye | Crude Yield, Percent | Recrystallized from— | Melting Point (corr.) ° C |
|---|---|---|---|
| (A) | 81 | Ethanol | 243–244 (dec.) |
| (B) | 63 | ----do | 278–.5279 (dec.) |
| (C) | 95 | ----do | 258.5–269.5 (dec.) |
| (D) | 59 | ----do | 246–247 (dec.) |
| (E) | 74 | ----do | 277–278 (dec.) |

EXAMPLE 7

1,8-ethylene-1',3,3'-trimethylindothiazolinocarbocyanine perchlorate 9,9 - dimethyl - 2,3-dihydro - 1H,9H - pyrrolo[1,2-a] indolium bromide (0.80 g., 3 mmol.), 2-β-anilinovinyl-3-methylthiazolinium iodide (1.04 g., 3 mmol.), acetic anhydride (0.42 ml., 4.5 mmol.), triethylamine (0.63 ml., 4.5 mmol.), and pyridine (5 ml.) were refluxed for 8 minutes and cooled. The mixture was diluted with water (40 ml.) and chilled overnight. Because only a trace of precipitate had separated, the mixture was warmed, a little ethanol added to dissolve the solid, and a concentrade 50% aqueous ethanol solution of sodium perchlorate (0.37 g., 3 mmol.) added. The solvent was evaporated and the residue stirred with a little isopropyl alcohol. The resulting crystals weer filtered and dried. The yield was 0.30 g. (25%) of dye. Recrystalized twice from ethanol, it melted at 212–213° (dec.).

EXAMPLE 8

3'-ethyl-1,8-ethylene-3,3 - dimethylindothiadicarbocyanine iodide 9,9 - dimethyl - 2,3 - dihydro - 1H,9H - pyrrolo[1,2-a] indolium bromide (0.80 g., 3 mmol.), 2-(4-acetanilidobutadienyl) - 3 - ethylbenzothiazolium iodide (1.43 g., 3 mmol.), triethylamine (0.63 ml., 4.5 mmol.), and pyridine (5 ml.) were refluxed for 7 minutes and cooled. The dye was precipitated with water (25 ml.) and the mixture chilled overnight. The dye was filtered off, washed with water, and dried. The yield as 1.18 g. (75%). Recrystallized twice from ethanol it melted at 242–243° C. (dec.).

EXAMPLE 9

Anhydro-1,8-ethylene-3,3-dimethyl-5'-phenyl-3'-(3-sulfobutyl) indooxacarbocyanine hydroxide 1-anilinomethylene - 9,9 - dimethyl-2,3-dihydro-1H,9H-pyrrolo[1,2-a]indolium bromide (1.11 g., 3 mmol.), anhydro - 5 - phenyl-3-(3-sulfobutyl) benzoxazolium hydroxide (1.04 g., 3 mmol.), acetic anhydride (0.42 ml., 4.5 mmol.), triethylamine (0.63 ml., 3 mmol.) and n-butyl alcohol (5 ml.) were refluxed for six minutes and cooled. A second equivalent portion of acetic anhydride was added at the middle of the refluxing period. The dye was precipitated from solution with ether and the mixture chilled to give crystalline dye. It was filtered off, washed with ether, and dried. The yield was 0.95 g. (59%). Recrystallized twice from ethanol the dye melted at 288–289° C. (dec.) .

EXAMPLE 10

1,8:1',10-diethylene-3,3,3',3'-tetramethyl-4,5:4',5'-dibenzoindocarbocyanine bromide

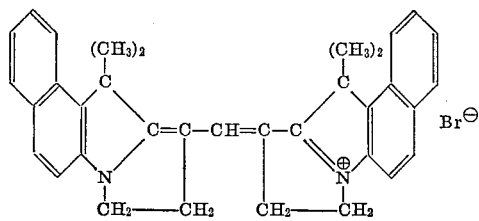

11,11 - dimethyl - 8,9 - dihydro - 10H,11H - benzo[c]pyrrolo[1,2-a]indolium bromide (1.59 g., 5 mmol.), diethoxymethyl acetate (0.81 g., 5 mmol.), triethylamine (0.84 ml., 6 mmol.), and pyridine (5 ml.) were refluxed for 10 minutes and cooled. The dye was precipitated by water (35 ml.), the mixture chilled, and filtered. The yield was 0.92 g. (66%). Twice recrystallized from ethanol, the dye melted at 293° C.

EXAMPLE 11

(A) 3'-ethyl-1,8-ethylene-3,3-dimethyl-4,5-benzoindothiacarbocyanine iodide

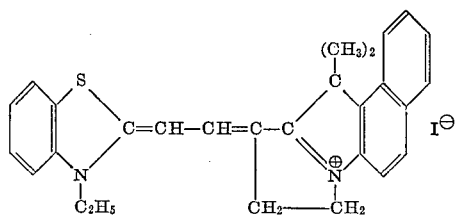

11,11 - dimethyl - 8,9 - dihydro - 10H,11H - benzo[c]pyrrolo[1,2-a]indolium bromide (0.63 g., 2 mmol.), 2-β-acetanilidovinyl-3-ethylbenzothiazolium iodide (0.90 g., 2 mmol.), triethylamine (0.42 ml., 3 mmol.) and pyridine (5 ml.) were refluxed for five minutes and cooled. The dye was precipitated by the addition of water (35 ml.). The mixture was chilled and filtered. The dye was washed with water and dried. The physical data are given under A in Table III.

Similarly the following dyes were prepared (characteristics in Table III:

(B) 3'-ethyl-1,8-ethylene-3,3-dimethyl-4,5-benzoindooxacarbocyanine iodide
(C) 3'-ethyl-1,8-ethylene-3,3-dimethyl-5'-phenyl-4,5-benzoindooxacarbocyanine iodide
(D) 3'-ethyl-1,8-ethylene-3,3-dimethyl-4,5:6',7'-dibenzoindooxacarbocyanine iodide

TABLE III.—CHARACTERISTICS OF THE CARBOCYANINES OF EXAMPLE II

| Dye | Crude Yield, Percent | Recrystallized from— | Melting Point (corr.) ° C. |
|---|---|---|---|
| A | 68 | Ethanol | 269.5–271.5 (dec.) |
| B | 64 | do | 289–290 (dec.) |
| C | 90 | Methanol | 280.5–281 (dec.) |
| D | 59 | do | 214–216 (dec.) |

The sensitizing effect of the dyes of Examples 5 to 11 above is illustrated in the following Table IV where the sensitizing range and sensitizing maximum values are shown for these dyes. The dyes were tested in a silver bromoiodide (BrI) emulsion containing 0.77 mole percent iodide of the type described by Trivelli and Smith, Phot. Journal, 79, 330 (1939). The dyes, dissolved in suitable solvents, were added to separate portions of the emulsion in amounts in the range from about 40 to 130 mg./mole of silver halide. After digestion at 50° C. for 10 minutes, the emulsions were coated at a coverage of 432 mg. of Ag/ft.² on a cellulose acetate film support. A sample of each coating was exposed on a sensitometer and to a wedge spectrograph, processed for 3 minutes in conventional developer, fixed, washed and dried. These dyes were also tested in a silver chlorobromide (ClBr) emulsion following the above procedure. The dyes of Examples 1 to 4 were tested in similar manner.

Although the above test procedure shows coatings on only a cellulose acetate support, it is to be understood that my photographic silver halide emulsions are coated advantageously on any of the support materials used in photographic elements, including glass, paper, cellulose acetate, cellulose nitrate, and synthetic film-forming resinous materials, such as the polystyrenes, the polyesters, the polyamides, etc.

TABLE IV

| Example | Emulsion | Photographic sensitizing data — Dye sensitizes to (mμ)— | Maximum sensitization (mμ) |
|---|---|---|---|
| 5(A) | ClBr | 685 | 655 |
|  | BrI | 680 | 645 |
| 5(B) | ClBr | 660 | 635 |
|  | BrI | 660 | 640 |
| 5(C) | ClBr | 620 | 585 |
|  | BrI | 620 | 590 |
| 5(D) | ClBr | 650 | 620 |
|  | BrI | 645 | 620 |
| 5(E) | ClBr | 640 | 605 |
|  | BrI | 625 | 595 |
| 5(F) | ClBr | 635 | 605 |
|  | BrI | 630 | 600 |
| 5(G) | ClBr | 720 | 690 |
|  | BrI | 730 | 705 |
| 6(A) | ClBr | 710 | 675 |
|  | BrI | 710 | 675 |
| 6(B) | ClBr | 640 | 595 |
|  | BrI | 630 | 595 |
| 6(C) | ClBr | 710 | 675 |
|  | BrI | 710 | 670 |
| 6(D) | ClBr | 670 | 635 |
|  | BrI | 670 | 635 |
| 6(E) | BrI | 760 | 725 |
| 7 | ClBr | 590 | 550 |
|  | BrI | 580 | 555 |
| 8 | ClBr | 735 | 710 |
|  | BrI | 750 | 715 |
| 9 | ClBr | 630 | 595 |
|  | BrI | 630 | 595 |
| 10 | ClBr | 720 | 690 |
|  | BrI | 725 | 69t |
| 11(A) | ClBr | 675 | 635 |
|  | BrI | 670 | 655 |
| 11(B) | ClBr | 640 | 600 |
|  | BrI | 630 | 600 |
| 11(C) | ClBr | 650 | 605 |
|  | BrI | 640 | 605 |
| 11(D) | ClBr | 660 | 610 |
|  | BrI | 650 | 610 |

The new class of carbocyanine dyes of the invention are particularly useful for sensitizing silver halide emulsions to maximum sensitization in the region of the spectrum of from about 550 mμ to 725 mμ, as indicated by the values given in the above Table IV.

The following additional examples illustrate the preparation of the intermediate compounds employed in the preparation of the dyes of the invention.

EXAMPLE A

α-Isobutyryl-γ-butyrolactone

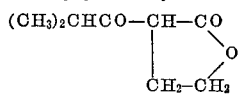

(a) To a solution of sodiumethoxide in absolute ethanol (125 ml.), prepared from sodium (8.5 g., 0.37 mol.), ethyl isobutyrylacetate (57.5 g., 0.364 mol.) was added with stirring and cooling. After stirring for over an hour, the mixture was chilled and an ice-cold solution of ethylene oxide (27 ml., 0.545 mol.) in absolute ethanol (25 ml.) added over a 30 minute period. The reaction mixture was stirred overnight. Acetic acid (30 ml.) was then added and the solvents removed under reduced pressure. The residue was taken up in water and extracted three times with ether. The ombined ether extracts were dried over anhydrous magnesium sulfate and the ether evaporated. The product distilled at 70–77° C. (2 mm.) yielding 27.9 g. (49%).

(b) Methyl isobutyrate (250 ml., 2.18 mol.) and about two-thirds of the total amount of sodium hydride (145 g. of a 54% dispersion in mineral oil, 3.26 mol.) were heated in a 3 l. flask by an oil bath at 100–110° C. With mechanical stirring a solution of γ-butyrolacetone (140 ml., 1.63 mole) in 270 ml. xylene was added at a rate of about one drop per second over 4½ hours. When about ⅓ of the butyrolactone solution had been introduced, the rest of the sodium hydride was added. As the mixture thickened, it was diluted proportionwise with xylene (500 ml.). One hour after the addition of the butyrolactone solution was complete, the mixture was cooled to 40° C. and ethanol (80 ml.) was added to destroy any excess sodium hydride. After dilution with xylene (100 ml.) and ether (300 ml.), much ice was added and the alkaline mixture neutralized with conc. hydrochloric acid (275 ml.). The layers were separated and the aqueous layer extracted with ether. The combined organic layers were washed successively with sodium bicarbonate until the effluent aqueous solution had a pH>7, again with water, and then dried over magnesium sulfate. When the solvents were removed under reduced pressure, the mixture separated into two layers, the top being mineral oil which was removed. The resulting solution was distilled through a 9-inch Vigreux column, the fraction boiling at 95–102° C.(0.07 mm.) accepted as product. The yield was 90 g. (35%).

EXAMPLE B

5 - hydroxy - 2 - methyl - 3 - hexanone
(CH₃)₂CHCOCH₂CH₂CH₂OH

α-Isobutyryl-γ-butyrolactone (27.9 f., 0.179 mol.), water (100 ml.) and concentrated hydrochloric acid (12.8 ml.) were heated with vigorous stirring to 70° and allowed to cool over two hours. The heating was repeated and the mixture stirred another two hours. The solution was neutralized and then saturated with potassium carbonate. The oil which separated was extracted twice with chloroform and the extract dried over anhydrous magnesium sulfate. After evaporation of the chloroform, the product distilling at 94–122° C. (16 mm.) was collected (15.0 g., 60%).

EXAMPLE C

5 - acetoxy - 2 - methyl - 3 - hexanone
(CH₃)₂CHCOCH₂CH₂CH₂OCOCH₃

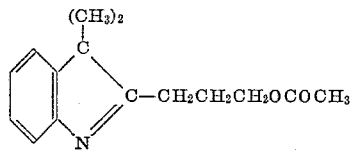

α-Isobutyryl-γ-butyrolactone (39 g., 0.25 mol.), potassium acetate (49 g., 0.5 mol.) and acetic acid (200 ml.) were refluxed for 16 hours. The mixture was concentrated to ½ its original volume, then ice, water and ether added. It was neutralized with conc. hydrochloric acid (42 ml.). The ether layer was separated and the aqueous solution extracted again with ether. The ether layer was washed with aqueous potassium carbonate, dried over magnesium sulfate, and the ether evaporated. The product boiled without forerun at 109–116° C. (10 mm.). Yield 30.8 g. (72%).

EXAMPLE D 2-(3-acetoxypropyl)-3,3-dimethyl-3H-indole

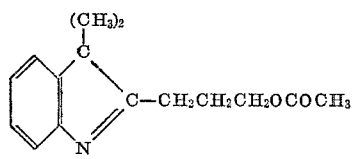

5-acetoxy-2-methyl-3-hexanone (17.2 g., 0.1 mol.), phenylhydrazine (10.8 g., 0.1 mol.) and acetic acid (1 ml.) were shaken together, the reaction proceeding exothermically. After water began to separate, the mixture was heated on the steam bath ½ hour, then cooled and diluted with two volumes of ether. The water layer was run off and the ether layer was dried over magnesium sulfate. The ether was evaporated and the resulting oil was treated with acetic acid (30 ml.) and conc. sulfuric acid (8 drops). This mixture was heated on the steam bath but was removed when the temperature of the reaction began to rise rapidly. When the heat evolution subsided, the mixture was refluxed for 30 minutes and then cooled. Ice, water and ether were added and the mixture made strongly basic with 50% aqueous sodium hydroxide solution. The ether layer was separated and combined with two subsequent ether extracts from the aqueous layer. It was dried over magnesium sulfate and ether evaporated. The product, 17.2 g. (70%) was obtained by distillation at 143–152° C. (1.5 mm.).

EXAMPLE E 2-(3-acetoxypropyl)1,3-dimethyl-3H-benz[a]indole

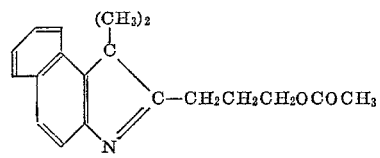

5-acetoxy-2-methyl-3-hexanone (21.5 g., 0.125 mol.) and 2-naphthylhydrazine (19.7 g., 0.125 mol.) were warmed together on the steam bath, then acetic acid (1 ml.) added. After heating on the steam bath for 1¾ hours, the mixture was cooled and 2 volumes of ether were added. The water which had separated was drawn off and the ether layer dried over magnesium sulfate. The residue left after evaporation of the ether was treated with acetic acid (40 ml.) and conc. sulfuric acid (10 drops). The mixture was heated on the steam bath whereupon the temperature rose gradually to 135° C. After the reaction subsided, the mixture was refluxed for 30 minutes. On cooling overnight, crystallization began. The mixture was diluted with water, filtered, the precipitate resuspended in water and the solution made basic with sodium hydroxide. The solid was filtered off, washed with water and dried. The yield was 28.7 g. (78%). It melted at 126–128° C. after recrystallization from ethyl acetate.

EXAMPLE F 2-(3-hydroxypropyl)-3,3-dimethyl-3H-benz[e]indole

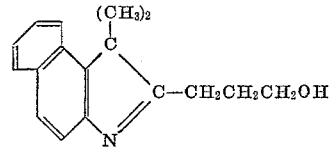

2(3-acetoxypropyl)-3,3 - dimethyl - 3H - benz[e]indole (37.6 g., 0.127 mol.) was saponified by refluxing for ½ hour with a solution of potassium hydroxide (8.4 g., 0.127 mole) in ethanol (150 ml.). After the alcohol was removed in vacuo, water was added which caused the product to separate as an oil. On chilling, the oil crystallized and was filtered off. After drying in vacuo the product was suspended in hot benzene, filtered, the filtrate diluted with ligroin (B.P.>100° C.) and cooled. The crystalline product was filtered off and dried. The yield was 29 g. (90%) of compound melting at 103–105° C. after recrystallization from ethyl acetate.

EXAMPLE G 2-(3-hydroxypropyl)-3,3-dimethyl-3H-indole

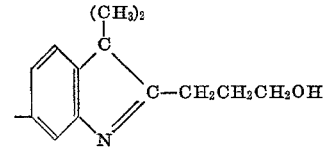

A solution of 2-(3-acetoxypropyl)-3,3-dimethyl-3H-indole (43.2 g., 0.176 mol.) and potassium hydroxide (11.6 g., 0.176 mol.) in ethanol (200 ml.) was refluxed for 35 minutes. The ethanol was evaporated and the residue taken up in water (300 ml.) from which the product crystallized on standing in the refrigerator overnight. It was filtered off and dried. Yield 29.3 g. (82%). After recrystallization from ethyl acetate it melted at 98–99° C.

EXAMPLE H 9,9-dimethyl-2,3-dihydro-1H,9H-pyrrolo[1,2-a]indolium bromide

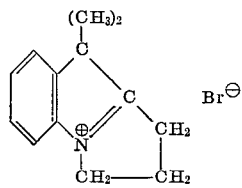

(a) 5-hydroxy-2-methyl-3-hexanone (15.0 g., 0.115 mol.), phenylhydrazine (11.4 ml., 0.115 mol.) and acetic acid (10 drops) were heated on the steam bath for 1½ hours. Ether (100 ml.) was added and the water which separated during the reaction extracted. The ether layer was dried over $MgSO_4$ and the solvent evaporated. The phenylhydrazone residue was treated with acetic acid (40 ml.) and sulfuric acid (1 drop) and warmed gently until the reaction was self-supporting. After the reaction subsided it was heated on the steam bath for a half-hour. The cooled mixture was poured on ice and made strongly alkaline with 40% sodium hydroxide. The viscous oil formed was extracted with ether twice. The ether extracts were dried over anhydrous magnesium sulfate and the solvent-evaporated. The residue, containing primarily 2-γ-hydroxypropyl-3a3-dimethyl-3H-indole, was taken up in 50 ml. 30% hydrogen bromide in acetic acid, heated on the steam bath for two hours, and refluxed one hour. The product was precipitated with ether and the solvents decanted. After washing with ether the residue was treated with 5% aqueous sodium carbonate and extracted with ether. The ether layer was dried over anhydrous magnesium sulfate and evaporated. The residue was treated with 15 ml. 30% hydrogen bromide in acetic acid. On the addition of acetone, crystals of the product separated and were filtered off. The yield of the quaternary salt was 9.45 g. (30.97), M.P. 173–175° C.

(b) 2-(3-hydroxypropyl)-3,3-dimethyl-3H-indole (20.3 g., 0.1 mole) was heated overnight on the steam bath with 30% hydrogen bromide in acetic acid (108 g., mole) and thereafter refluxed one hour. The mixture was chilled and the product precipitated with ether. The semisolid residue was washed twice with ether and then stirred with acetone from which it crystallized. The quaternary salt was filtered, washed with acetone and dried. The yield was 17.3 g. (65%), M.P. 173–175° C.

EXAMPLE I 1-anilinomethylene-9,9-dimethyl-2,3-dihydro-1H,9H-pyrrole[1,2-a]indolium bromide

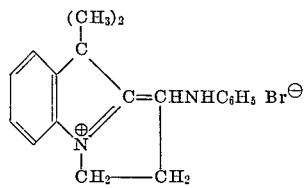

9,9-dimethyl-2,3-dihydro-1H,9H-pyrrolo[1,2-a]indolium bromide (17.3 g., .065 mole) and o-ethylisoformanilide (38.7 g., 0.26 mole) in n-butyl alcohol were refluxed 45 minutes and cooled. The mixture was diluted to about 500 ml. with ether. The solvent was decanted from the resulting tarry residue which was then made to crystallize by stirring with acetone. The precipitate was filtered and dried. The yield was 10.8 g., another 1.2 g. was recovered from the filtrate by addition of ether, making a total yield of 50%.

By substituting the indolium bromide in the above example with 11,11-dimethyl-8,9-dihydro-10H,11H-benzo[e]pyrrolo[1,2-a]-indolium bromide or with 11,11-dimethyl-2,3-dihydro-1H,11H-benzo[f]pyrrolo[1,2-a] indolium bromide, or with 7,7-dimethyl-9,10-dihydro-7H,8H-benzo[g]pyrrolo([1,2-a]indolium bromide, the corresponding anilinomethylene derivatives are obtained.

EXAMPLE J 11,11-dimehtyl-8,9-dihydro-10H,11H-benzo[c] pyrrolo[1,2-a]indolium bromide

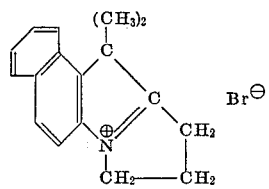

2-(3-hydroxypropyl)-3,3-dimethyl-3H-benz[e]indole (16.5 g., 0.065 mol.) was heated with 30% hydrobromic acid in acetic acid (70 g., 0.26 mol.) on the steam bath for 16 hours. A small amount of black solid was filtered off. When the filtrate was treated with ether, a residue separated which was further washed with ether. This residue crystallized when stirred with acetone. It was filtered and washed with acetone. When this salt was dissolved in and refluxed with dimethylacetamide (50 ml.) the product separated from solution. The mixture was chilled, and the precipitate filtered off, washed with acetone and dried. The yield was 10.8 g. (53%). When recrystallized from ethanol, it melted at 275–276° C. (dec.).

The invention has been described in detail with particular reference to preferred embodiments thereof, but it will be understood that variations and modifications can be effected within the spirit and scope of the invention.

I claim:

1. A compound having the general formula:

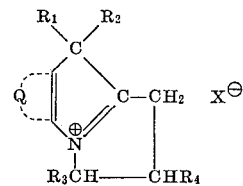

wherein $R_1$ and $R_2$ each represents an alkyl group having 1 to 5 carbon atoms, $R_3$ and $R_4$ each represents a hydrogen atom, a methyl group or an ethyl group, X represents an acid anion and Q represents the nonmetallic atoms required to complete a benzene ring or a naphthalene ring and wherein said benzene ring and said naphthalene ring can be substituted with a member selected from the group consisting of an alkyl group having 1 to 4 carbon atoms, benzyl, an alkoxy group having 1 to 4 carbon atoms, a phenyl group, a tolyl group, a phenoxy group, a halogen atom or a dialkylamino group wherein the alkyl groups have 1 to 4 carbon atoms.

2. A compound in acocrdance with claim 1 having the formula:

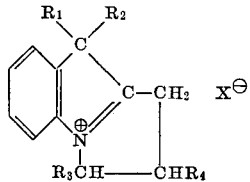

wherein $R_1$ and $R_2$ each represents an alkyl group having 1 to 5 carbon atoms, $R_3$ and $R_4$ each represents a hydrogen atom, a methyl group or an ethyl group and X represents an acid anion.

3. The compound 9,9-dimethyl-2,3-dihydro-1H,9H-pyrrolo-[1,2-a]indolium bromide.

4. The compound 11,11 - dimethyl-8,9-dihydro-10H, 11H-benzo-[e]pyrrolo[1,2-a]indolium bromide.

5. A carbocyanine dye selected from those represented by the following general formulas:

I.
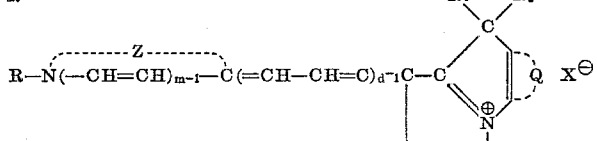

II.
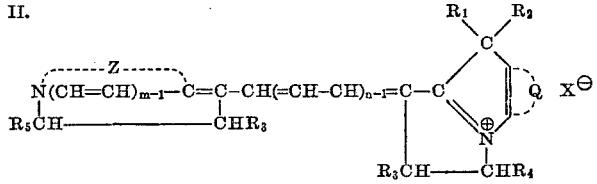

III.
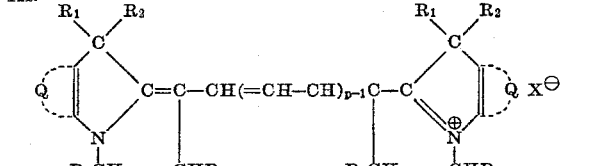

wherein $d$ represents an integer of from 2 to 5, $m$ represents an integer of from 1 to 2, $n$ and $p$ each represents an integer of from 1 to 4, R represents an alkyl group having 1 to 8 carbon atoms, a sulfoalkyl group having 2 to 4 carbon atoms, a carboxyalkyl group having 3 to 5 carbon atoms, a hydroxypropyl group, a phenyl group, a sulfophenyl group, a carboxyphenyl group or a tolyl group, $R_1$ and $R_2$ each represents an alkyl group having 1 to 5 carbon atoms, $R_3$, $R_4$, $R_5$ and $R_6$ each represents a hydrogen atom, a methyl group or an ethyl group, X represents an acid anion, Q represents the nonmetallic atoms required to complete a benzene ring or a naphthalene ring and wherein said benzene ring and said naphthalene ring can be substituted with a member selected from the group consisting of an alkyl group having 1 to 4 carbon atoms, benzyl, an alkoxy group having 1 to 4 carbon atoms, a phenyl group, a tolyl group, a phenoxy group, a halogen atom or a dialkylamino group wherein the alkyl groups have 1 to 4 carbon atoms, and Z represents the nonmetallic atoms required to complete a 5- to 6-membered heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, 2-pyridine nucleus, a 4-pyridine nucleus, a 2-quinoline nucleus, a 4-quinoline nucleus, a 1-isoquinoline nucleus, a 3-isoquinoline nucleus, a 3,3-dialkylindolenine nucleus, an imidazole nucleus, a benzimidazole nucleus, and a naphthimidazole nucleus.

6. The dye 1,8,1',10 - diethylene-3,3,3',3'-tetramethylindocarbocyanine iodide.

7. The dye 3' - ethyl-1,8-ethylene-3,3-dimethyl-4',5'-benzoindothiacarbocyanine bromide.

8. The dye 1' - ethyl - 1,8-ethylene-3,3-dimethylindo-2'-carbocyanine iodide.

9. The dye 3' - ethyl - 1,8-ethylene-3,3-dimethylindothiacarbocyanine iodide.

10. The dye 1,8,1',10 - diethylene-3,3,3',3'-tetramethyl-4,5,4',5'-dibenzoindocarbocyanine bromide.

11. A carbocyanine dye in accordance with claim 5 having the formula designated I in claim 5.

12. A carbocyanine dye in accordance with claim 5 having the formula designated II in claim 5.

13. A carbocyanine dye in accordance with claim 5 having the formula designated III in claim 5.

References Cited

UNITED STATES PATENTS

| | | | |
|---|---|---|---|
| 2,066,966 | 1/1937 | Dieterle et al. | 260—240.65 XR |
| 2,107,379 | 2/1938 | Koslowsky | 260—240.6 |
| 2,126,078 | 8/1938 | Zeh et al. | 260—240.6 XR |
| 2,415,927 | 2/1947 | Anish | 260—240.6 XR |
| 3,282,932 | 11/1966 | Lincoln et al. | 260—240.4 |

OTHER REFERENCES

Babichev et al.: J. Gen. Chem. U.S.S.R., vol. 34, pages 2455 to 2462 (1964).

Lasschtuvka et al.: Chem. Ber., vol. 93, pages 81 to 88 (1960).

JOHN D. RANDOLPH, Primary Examiner

U.S. Cl. X.R.

96—106; 260—240.5, 240.65, 240.7, 240.8, 313.1, 326.13, 326.16, 343.3, 594, 602

PO-1050
(5/69)

UNITED STATES PATENT OFFICE
CERTIFICATE OF CORRECTION

Patent No. 3,505,319        Dated April 7, 1970

Inventor(s) Gene L. Oliver

It is certified that error appears in the above-identified patent and that said Letters Patent are hereby corrected as shown below:

Column 15, that part of Formula I reading $-C(=CH-CH=C)_{d-1}$ should read $-C(=CH-CH)_{d-1}$.

Column 15, that part of Formula II reading

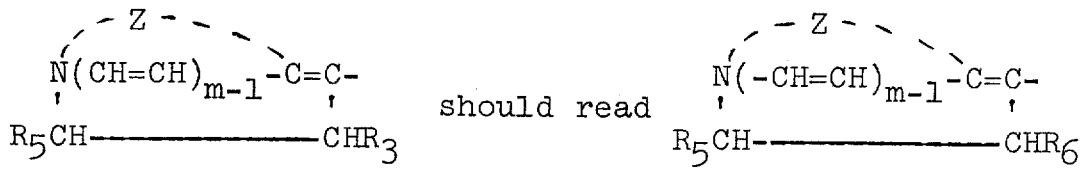

Signed and sealed this 7th day of December 1971.

(SEAL)
Attest:

EDWARD M. FLETCHER, JR.              ROBERT GOTTSCHALK
Attesting Officer                    Acting Commissioner of Patents